S. J. BAIRD.
Button-Holing Attachment for Sewing Machines.
No. 134,347. Patented Dec. 31, 1872.
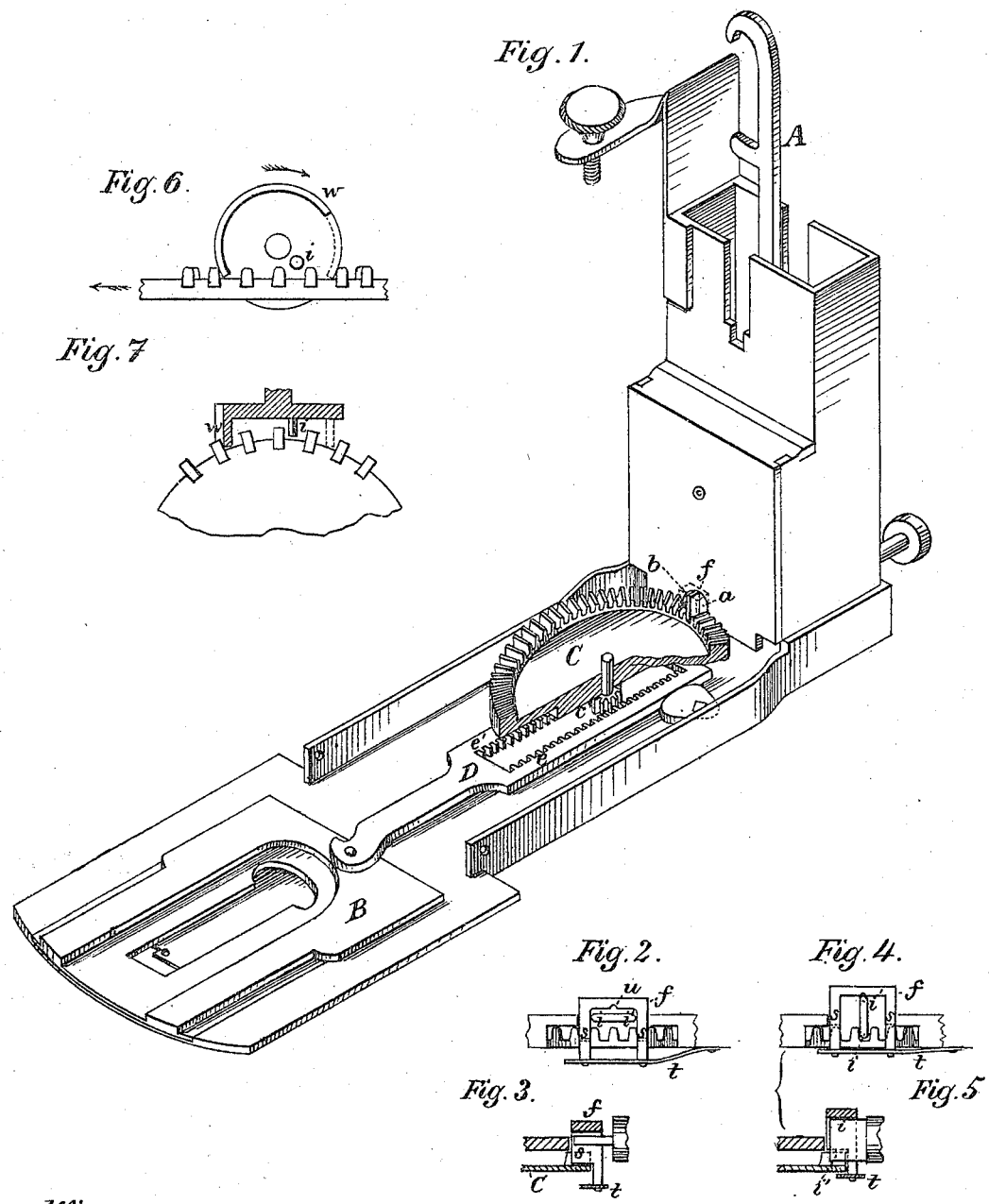

UNITED STATES PATENT OFFICE.

SAMUEL J. BAIRD, OF WAYNESBOROUGH, VIRGINIA.

IMPROVEMENT IN BUTTON-HOLING ATTACHMENTS FOR SEWING-MACHINES.

Specification forming part of Letters Patent No. 134,347, dated December 31, 1872.

*To all whom it may concern:*

Be it known that I, SAMUEL J. BAIRD, of Waynesborough, county of Augusta, State of Virginia, have invented an Improvement in Button-Hole Attachments, of which the following is a specification:

My invention relates to improvements in the button-hole attachment for sewing-machines granted to me on the 25th day of July, 1871; and the object of my invention is to simplify the mechanism by which the reciprocating longitudinal movement is imparted from the needle arm or bar to the cloth holder or clamp.

In Figure 1 of the accompanying drawing, $a$ represents the shaft, to which an intermittent rotary motion is imparted by the movement of the rod A, connected to the needle arm or bar, and B is the lower plate of the cloth clamp or holder, the upper plate being removed. On the outer end of the shaft $a$ is a pinion, $b$, having but two teeth, $i$ $i'$, which are diametrically opposite each other, and which engage with the horizontal crown-wheel C; and at the lower side of the latter is a pinion, $c$, adapted to parallel racks $e$ $e'$ on an arm, D, attached to the clamp B. By means of a cam or eccentric, $d$, on one side of the arm D, and a spring on the other, or by any other suitable device, the arm may be adjusted to bring either rack in connection with the pinion $c$, so that without reversing the rotation of the crown-wheel, the clamp, by merely shifting the position of the arm, may be carried longitudinally in either direction. As there are but two teeth to the pinion $b$ there are two periods during each revolution of the pinion when it is free from contact with the crown-wheel, Figs. 2 and 3, and the latter is at rest.

In order that the wheel or clamp may not be displaced during these periods, I employ a pawl or yoke, $f$, having one or two teeth, $s$ $s$, so arranged in respect to the pinion $b$ that when the lower tooth of the latter is about to engage with a tooth of the crown-wheel the upper tooth will strike and raise the pawl, and lift its teeth free from those of the wheel, Fig. 4, the pawl being secured to a spring, $t$, which causes it to descend, and its teeth to engage with and secure the wheel after the teeth of the pinion have passed from contact therewith.

To prevent the pressure of the pawl from turning the shaft when the teeth are on a vertical or nearly vertical line, a notch, $u$, for the reception of the upper tooth is made in the pawl.

In place of the double-toothed pinion and pawl there may be but one tooth, $i'$, on the shaft $a$, Figs. 6 and 7, and the wheel C may have both crown-teeth and cogs, the tooth $i'$ bearing upon the side of one of the crown-teeth, and imparting a partial rotation to the wheel, which is then securely retained in its position by a semi-annular projection, $w$, so arranged on the shaft $a$ as to engage with the cogs the instant the tooth $i$ passes from contact with the crown-tooth.

By the arrangement above described the reciprocating motion of the clamp is effected without reversing the revolution of the shaft $a$; but when the latter can be readily reversed, as in my button-hole sewing-machine attachment before referred to, the arm D may have but one ratchet, which will be in constant contact with the pinion $c$.

I claim as my invention—

1. The combination of the clamp B, the wheel C, bar D having teeth adapted to those of a pinion, $c$, on the wheel, and devices, substantially as described, for imparting motion to the said wheel.

2. The shaft $a$ with its teeth $i$ $i'$, arranged, as described, in combination with the toothed wheel C.

3. The combination, with the pinion $b$ and the wheel C, of the pawl operated on the movement of the pinion, as set forth.

4. The toothed wheel C, in combination with the shaft $a$, its tooth or pin $i$, and curved projection $w$, arranged and operating as set forth.

In testimony whereof I have signed my name to this specification in the presence of two subscribing witnesses.

SAMUEL J. BAIRD.

Witnesses:
 JOHN HUFF,
 WILLIAM WITHROW, Jr.